No. 759,830. PATENTED MAY 10, 1904.
G. H. RICKE.
FRUIT JAR.
APPLICATION FILED MAR. 30, 1903.
NO MODEL.

WITNESSES:
Chas. A. Ahlborn
Henry Baer

INVENTOR
George H. Ricke
BY
Attorney

No. 759,830.

Patented May 10, 1904.

UNITED STATES PATENT OFFICE.

GEORGE H. RICKE, OF CINCINNATI, OHIO, ASSIGNOR TO WILLIAM A. RINCKHOFF, OF CINCINNATI, OHIO.

FRUIT-JAR.

SPECIFICATION forming part of Letters Patent No. 759,830, dated May 10, 1904.

Application filed March 30, 1903. Serial No. 150,100. (No model.)

*To all whom it may concern:*

Be it known that I, GEORGE H. RICKE, a citizen of the United States, residing at the city of Cincinnati, in the county of Hamilton and State of Ohio, have invented certain new and useful Improvements in Fruit-Jars, of which the following is a specification.

The object of my invention is to produce a cheap, simple, and efficient closure for fruit-jars, the jar and lid being all of glass, the use of cross and binding wires for holding the lid being dispensed with entirely, the lid being held tight and securely in place by the use of corks wedged in between the lid and the edge of the jar-mouth in connection with the use of paraffin or analogous material to hermetically seal the lid in the jar-mouth.

It is preferable to use a jar made entirely of glass. The jar commonly used, with a tin or metal screw-cap and a rubber gasket, is objectionable. The joint is not always made absolutely tight. This spoils the fruit. The rubber gaskets are often used again, and in this way the joint is sure to be imperfect. Thus the fruit is spoiled. It is very hard to remove the metal cap, as it is screwed tightly in the screw-thread of the jar, the juice from the fruit and the rubber making it sticky. Part of the fruit is often taken out of the jars surreptitiously and the gasket and cap replaced, the air getting into the jar and the fruit is spoiled. Metal caps are also objectionable, glass being preferred. To overcome these ojections, many glass jars have been invented with glass lids; the lids being held in place by bands, cross-wires, and binding-wires. These are hard to put on and to keep in place, are objectionable in shipping, rust, and are very hard to take off. I overcome all these objections and dispense with the use of metal screw-caps, screw-threaded jar-mouths, rubber or other gaskets, cross-wires, bands, and binding-wires.

Figure 1:
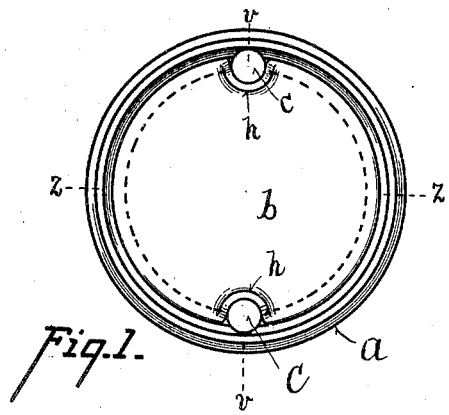
Figure 6:
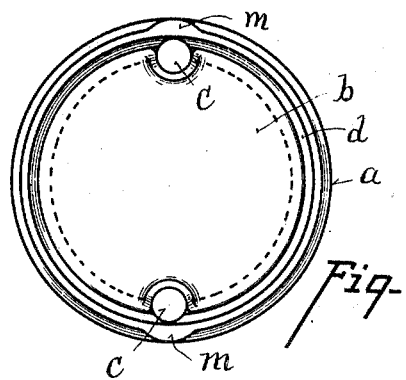
Figure 2:
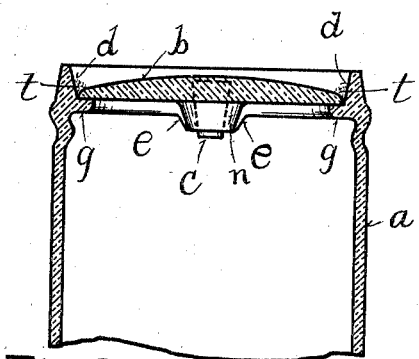
Figure 4:
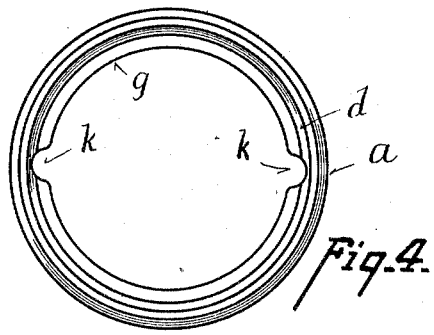
Figure 3:
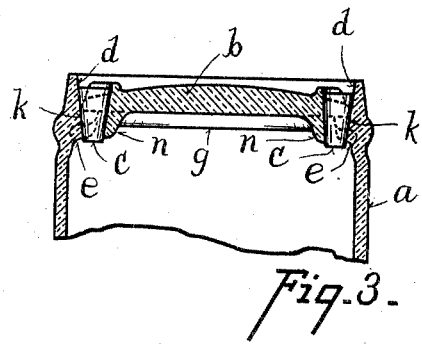
Figure 5:
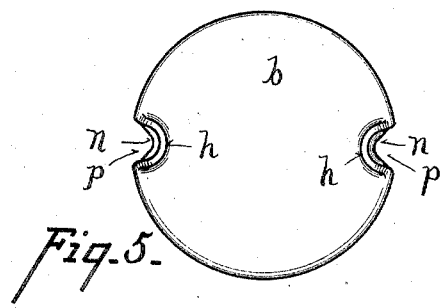

In the accompanying drawings, forming part of this specification, Figure 1 is a top view of the jar and lid. Fig. 2 is a sectional view taken on the line $z\,z$ of Fig. 1. Fig. 3 is a sectional view taken on the line $v\,v$ of Fig. 1, all the parts being in section except the corks. Fig. 4 is a top view of the jar, the lid being removed. Fig. 5 is a top view of the lid, and Fig. 6 a top view of a modified form of jar-top.

In the drawings, $a$ represents the jar-body; $b$, the lid or cover; $c$, the corks, wedges, or retainers. The jar-body $a$ is of the usual construction except at its mouth, which is beveled, inclined, or flared, (see Figs. 2 and 3,) as shown at $d$, the flared or inclined portion $d$ extending down at point where the corks are used, as shown at $e$, Figs. 2 and 3, to form a better bearing-surface for the corks or wedges $c$. Inside the mouth of the jar is cast a shoulder $g$. (Shown in dotted lines in Fig. 3.) On this shoulder $g$ the lid $b$ rests. The inclined portion $d$ and extension $e$ are present at the point where the corks $c$ are used and are of the shape shown at $k$—that is, semicylindrical, widest at the top, and more contracted at the bottom, so as to fit the taper of the corks $c$. The lid $b$ is of the shape shown in Fig. 5, having cut-away part or recess $p$, surrounded at the top by a lug or ridge $h$ and downwardly-extending semicylindrical flange or extension $n$. The bearing-surface formed by the recess $p$ and ridge $h$ and flange $n$ is a counterpart of the bearing-surface formed by the inclined portion $d$ and extension $e$, so that the two bearing-surfaces together form a mouth much like the mouth of a bottle, so that when the corks or wedges $c$ are forced in the recess formed between them they will tightly, securely, and firmly hold the lid $b$ in place and not allow it to move in any direction.

In use when the jar is filled the lid $b$ is placed in the mouth of the jar, resting on the shoulder $g$, the lid being so placed that the recess $p$ will be opposite the recess $k$ in the jar-mouth. The corks or wedges $c$ are then dipped into paraffin and forced tightly into the mouth formed by the recesses $p$ and $k$, paraffin $t$ being also then poured around the edge of the lid, so that any space left between the lid and jar-mouth will be filled. Thus a hermetically-sealed joint is formed between the lid and jar-mouth, insuring absolute security for the contents of the jar from the outside. No air can get into the jar, no dampness, no fear from the varying degrees of temperature, and the fruit will not be molested, as the lid cannot be properly or hastily replaced. The jar can be readily and easily opened, all that is necessary being the removal of the paraffin by a knife and the extraction of the corks.

If desired, the mouth of the jar opposite to where the corks are used can be strengthened by a lug $m$. (See modification in Fig. 6.) The mouth of the jar may be made of any other shape, contour, or construction, the lid may be differently formed, the specific manner of placing the corks or wedges $c$ between the lid and jar-mouth to hold the lid properly in place can be changed, the lugs, flanges, and extensions around the recesses $p$ and $k$ into which the corks $c$ fit can be changed and differently formed or even dispensed with, and the lid and jar-mouth made heavier or shaped differently to form a bearing for the corks or wedges $c$.

I may use only one wedge or cork $c$ or as many more as desired and may make them of any shape. I may use any other sealer than paraffin.

I may use my jar-closure in stone jars, bottles, or any other open-mouthed vessel where a perfectly tight closure is required.

What I claim as new and of my invention, and desire to secure by Letters Patent, is—

1. In a fruit-jar, the body of the jar, a lid, said lid resting in the mouth of the jar, semicircular cut-away parts at the edge of the lid and at the mouth of the jar, forming apertures between the lid and jar-mouth, in combination with corks, which corks fit into said apertures to tightly hold the lid in the jar-mouth, all combined and operating as set forth.

2. In a fruit-jar, the body of the jar, a lid, a shoulder in the mouth of the jar, said lid resting on said shoulder, the mouth of the jar extending downward at the points where the corks are placed, to form semicircular extensions, the lid provided with cut-away portions and flanges extending downward on said lid around said cut-away portions to form semicircular extensions, apertures being formed when said semicircular extensions come together when the lid is placed in the mouth of the jar, in combination with corks, said corks fitting said apertures to hold the lid tightly in place in the jar-mouth, as set forth.

3. In a fruit-jar, the body of the jar $a$, lid $b$, semicircular formations or extensions at the edge of the lid and mouth of the jar forming apertures between the lid and jar-mouth, corks $c$ fitting into said apertures, all combined and operating as set forth.

4. In a fruit-jar, body $a$, lid $b$, shoulder $g$, the lid $b$ resting on said shoulder $g$, semicircular recesses being formed on the edge of the lid and on the inner edge of the jar-mouth, said semicircular recesses, when the lid is placed in the jar-mouth coming opposite one another to form apertures, corks $c$, said corks fitting said apertures, all combined as set forth.

5. In a fruit-jar, the body of the jar $a$, having cut-away parts $k$, bearings $d$, $e$, a lid $b$, said lid having cut-away parts $p$, bearings $h$, $n$, apertures formed by said cut-away parts and bearings, corks $c$, said corks fitting said apertures, and seal $t$, as and for the purposes set forth.

GEORGE H. RICKE.

Attest:
CHAS. A. AHLBORN,
HENRY BAER.